United States Patent [19]

Ishikawa et al.

[11] Patent Number: 4,742,280
[45] Date of Patent: May 3, 1988

[54] CONTROL DEVICE FOR WIPER APPARATUS WITH TWO-DIRECTION ROTATABLE MOTOR

[75] Inventors: Toshihiro Ishikawa, Kosai; Keiichi Uemura, Kariya; Makoto Aso, Kariya; Masaaki Fukaya, Kariya, all of Japan

[73] Assignee: Nippondenso Co., Ltd., Kariya, Japan

[21] Appl. No.: 12,069

[22] Filed: Feb. 6, 1987

[30] Foreign Application Priority Data

Feb. 14, 1986 [JP] Japan ................................ 61-30485
Feb. 18, 1986 [JP] Japan ................................ 61-33176

[51] Int. Cl.⁴ ............................................. B60S 1/08
[52] U.S. Cl. .................................... 318/282; 318/444; 318/DIG. 2; 15/250.17
[58] Field of Search ............... 318/281, 282, 286, 443, 318/444, 445, 446, DIG. 2; 15/250.12, 250.17

[56] References Cited

U.S. PATENT DOCUMENTS

| | | | |
|---|---|---|---|
| 4,271,381 | 6/1981 | Munz et al. ...................... | 318/444 X |
| 4,309,646 | 1/1982 | Liedtke et al. .................... | 318/443 |
| 4,336,482 | 6/1982 | Goertler et al. .................. | 318/281 X |
| 4,585,980 | 4/1986 | Gille et al. ...................... | 318/443 X |
| 4,599,546 | 7/1986 | Uemura ............................ | 318/443 |
| 4,614,903 | 9/1986 | Betsch et al. ............. | 318/DIG. 2 X |
| 4,673,853 | 6/1987 | Tsunoda et al. ......... | 318/DIG. 2 X |

FOREIGN PATENT DOCUMENTS 55-102751  8/1980  Japan ................................. 15/250.12

Primary Examiner—Bentsu Ro
Attorney, Agent, or Firm—Cushman, Darby & Cushman

[57] ABSTRACT

A control device for a car wiper apparatus is disclosed, in which the wiper apparatus is driven in forward or reverse directions by the function of an electronic circuit. The control electronic circuit is so configured as to minimize the number of connection brushes for controlling the forward and reverse operations of the wiper motor which reciprocates the wiper blade. The reduced number of the connection brushes, which are arranged in the wiper motor, realizes a compact shape of the wiper motor as a whole. The electronic circuit functions to drive the wiper motor in forward and reverse directions within a predetermined angle thereby to rotate the crank arm connected with the wiper motor and the wiper blade with a small predetermined angle for reciprocal wiping operating, thus making it possible to mount the wiper apparatus in the small internal space of the car.

6 Claims, 11 Drawing Sheets

CONTROL DEVICE FOR WIPER APPARATUS WITH TWO-DIRECTION ROTATABLE MOTOR

BACKGROUND OF THE INVENTION

1. FIELD OF THE INVENTION

The invention relates to a control device for a wiper apparatus which has a two-direction rotatable motor for making wipers reciprocatingly wipe, for example, the rear or front windshield of an automobile, etc.

2. DESCRIPTION OF THE RELATED ART

A conventional wiper apparatus comprising a rise-up mechanism has been suggested (U.S. Pat. No. 4,599,546). The rise-up mechanism is defined as one used with a wiper apparatus for wiping the windshield surface in which upon turning off a wiper operation switch, the wiper blade is lowered below the lower limit of the wiping range thereof. This rise-up mechanism is used as a device for accomodating the wiper blade under a bonnet when not in wiping operation.

In the wiper apparatus disclosed by U.S. Pat. No. 4,599,546, a wiper motor is controlled to reciprocate the wiper blade by being driven in forward and reverse directions reciprocally within a predetermined angular range, thereby realizing a mechanism capable of the rise-up operation.

The above-mentioned prior art apparatus, in which forward and reverse operation is controlled by complicated mechanical switches, is complex in construction. The U.S. Pat. No. 4,309,646, on the other hand, discloses an apparatus in which such a mechanical means is replaced by an electronic circuit to overcome the above-described disadvantage.

The apparatus of U.S. Pat. No. 4,309,646, however, requires a complicated position detector for detecting the position of the wiper blade. Even if a comparatively simple cam device configured electrically is used in the apparatus, it is necessary to provide a conductive part movable with the wiper motor, three brushes slidable on the conductive part, and a connector for applying a source voltage to the conductive part. Normally, the connector is also constructed of a brush, and therefore the position detector is required to include four brushes. The electric cam device of this type, however, is arranged in a limited small space in the wiper motor, and therefore, in the case where the number of brushes is high, the wiper motor becomes bulky consequently or the brushes cannot be arranged in the motor for lack of ample space.

SUMMARY OF THE INVENTION

Accordingly, it is a first object of the present invention to provide a control device for a wiper apparatus which performs the required operation sufficiently with at least two brushes, or if the connector for applying a voltage to the conductive part is made up of a brush, not more than a maximum of three brushes are used for a position detector.

A second object of the present invention is to provide a control device for a wiper apparatus for driving a wiper motor in forward and reverse directions to perform wiping and accomodating operations, in which a simple control circuit configuration permits intermittent operation of wiper blades thereby to wipe the windshield intermittently at the time of drizzling.

According to the present invention, there is provided a control device for a wiper apparatus for driving a wiper motor in forward and reverse directions to perform reciprocal wiping of a wiper blade and to stop the wiper blade at an accomodating position outside of a predetermined wiping range as required, comprising position detector means with two brushes, one of which generates a stop signal when the wiper blade reaches the accomodating position, the other brush generating a reversal signal at upper and lower limits of the reciprocating operation, means for storing a signal reversed from an output signal thereof each time the reversal signal is applied thereto, the storage means continuing to produce a predetermined signal when the wiper operation switch is set to the operation OFF position, and forward-reverse selection means supplied with an output signal from the storage means for selecting a forward or reverse rotation signal applied to motor current control switch means in accordance with the output signal from the storage means. The means for detecting the wiper blade position, therefore, includes only two brushes maximum, one of which is for producing the same signal during both forward and reverse operations. This signal, from which it is not possible to determine the forward or reverse operation, is introduced to the signal storage means where the forward and reverse signals are alternately distributed.

The device according to the present invention further comprises drive signal generating means connected to the wiper operating switch and the position detector means for generating a signal for controlling the motor current control switch means in such a manner as to stop the wiper blades at the accomodation stop position on the basis of a stop signal from the position detector means.

Furthermore, the drive signal generating means according to the present invention includes means for generating different selection commands in accordance with the operation of the wiper operating switch, and drive signal output means for applying a drive signal to the means for selecting the forward rotation on the basis of a signal from the operating switch, and intermittent operation signal generating means for applying an intermittent operation signal to the selection command means and the selection designation means on the basis of a signal from the wiper operation switch thereby to operate the wiper blade intermittently, whereby the selection command means applies a signal to the selection control means to control the signal applied from the position detector means to the storage means and the signal applied to the drive signal output means, thereby driving the wiper motor intermittently.

DESCRIPTION OF THE PREFERRED EMBODIMENTS

Figure 1:
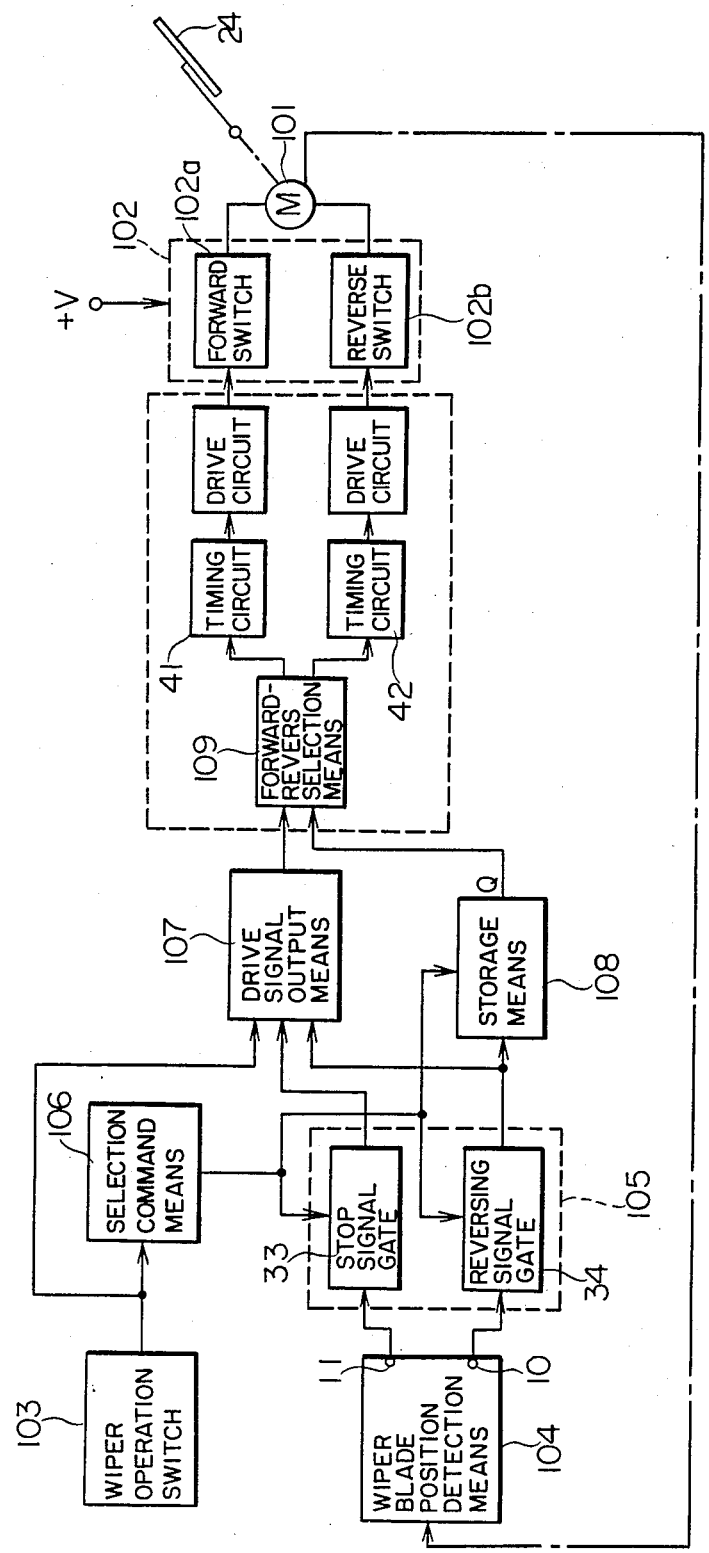
FIG. 1 is a block diagram showing a basic configuration of the present invention.

First, the basic configuration of the apparatus according to a first embodiment is shown schematically in the block diagram of FIG. 1. In FIG. 1, the control device for the wiper apparatus according to the present invention comprises switch means 102 for switching the direction of the voltage applied to a wiper motor 101, including a forward switch 102a and a reverse switch 102b operated by signals for controlling the switch means 102, result in swinging a wiper blade by energizing the wiper motor 101 in forward or reverse direction, a wiper operation switch 103 for selecting an operating mode of the wiper motor 101, a wiper blade position detector means 104 for detecting the operating position of the wiper blade, a selection control means 105 including a stop signal gate 33 and a reversing signal gate 34 for selecting a signal generated from the wiper blade position detector means 104, selection command means 106 for determining the operation of the selection control means 105 on the basis of an output signal from the wiper operation switch 103, drive signal output means 107 supplied with an output signal from the wiper operation switch 103 and the selection control means 105 for producing a drive signal for actuating the wiper motor 101, storage means 108 supplied with at least an output signal of the selection control means 105 for producing a signal for designating a selected one of forward and reverse operations, forward-reverse selection means 109 for selecting forward or reverse operation of the wiper motor 101 in accordance with the output Q of the storage means 108, and timing circuits 41, 42 for delaying the drive signal applied through the forward-reverse selection means 109 to the forward switch 102a or reverse switch 102b by a predetermined time length.

Figure 2:
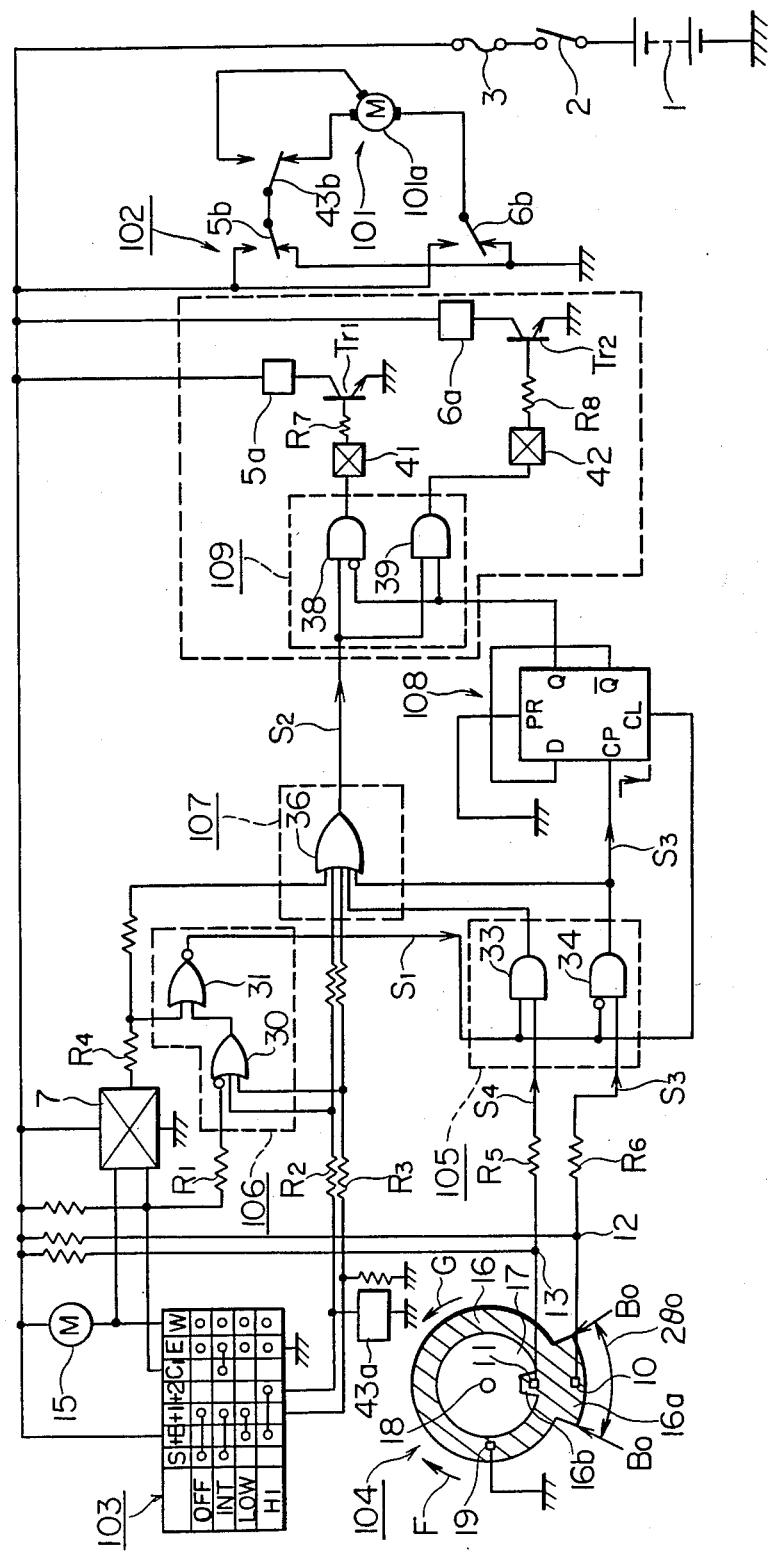
FIG. 2 is a diagram showing a specific control circuit for a wiper apparatus according to the present invention.

A specific electrical circuit according to an embodiment of the present invention is shown in FIG. 2. In description that follows, the each "means" described with reference to FIG. 1 above is explained as "circuits", "devices" or the like. In FIG. 2, reference numeral 1 designates a car battery, numeral 2 an ignition switch, and numeral 3 a fuse, which are connected in series in such a way that when the ignition switch is turned on, power is supplied to each part from the electrical circuit from the battery 1. Power of the car battery 1 is supplied through relay contacts 5b, 6b, 43b to an armature 101a of the wiper motor 101, or upon conduction of transistors $T_{r1}$, $T_{r2}$, to a forward relay coil 5a and a reverse relay coil 6a on the one hand, and to an intermittent operation control circuit 7, a wiper operation switch 103, terminals 12, 13 connected to contacts 10, 11 of a wiper blade position detector 104, and a selection command circuit 106 on the other hand.

The wiper operation switch 103, which is shown in the form of a connection table shown in FIG. 2, four selective positions for stop operation (OFF), intermittent operation (INT), low-speed operation (LOW) and high-speed operation (HI), and seven connecting terminals S, +B, +1, +2, $C_1$, E and W. The battery 1 is connected to the terminal +B, the washer motor 15 to the terminal W, the intermittent operation control circuit 7 to the terminal $C_1$ and W, and the terminal E grounded. Connections of terminals with respective positions selected are shown in the connection table.

The wiper blade position detector 104 includes a cam plate (not shown in FIG. 2), an electrode plate 16 making up a conductive part formed on the cam plate, and an insulating member 17 of resin or the like material formed on the electrode plate 16. The cam plate, the electrode plate 16 and the insulating member 17 are adapted to rotate integrally around a shaft 18. The electrode plate 16 has formed thereon an arcuate protrusion 16a at an angle of $2\theta_0$ on the outer edge thereof, and an inward protrusion 16b on the inner edge corresponding to the arcuate protrusion 16a. The electrode plate 16 has three contacts 10, 11, and 19 made of brushes arranged thereon as shown. The contact 19 is always kept in contact with the electrode plate 16 and grounded at the same time. The contact 11 is for detecting the stop position of the cam plate (corresponding to the accommodation position of the wiper blade), and is located at a position of being able to come in contact with the inner protrusion 16b. The contact 10 which is for detecting the reversing position of the cam plate (corresponding to the lower limit position of the wiping range of the wiper blade), on the other hand, is provided in contact with the arcuate protrusion 16a. The positions $B_0$ and $\overline{B_0}$ of the two edges of the arcuate protrusion 16a defines the reversing positions.

Figure 3:
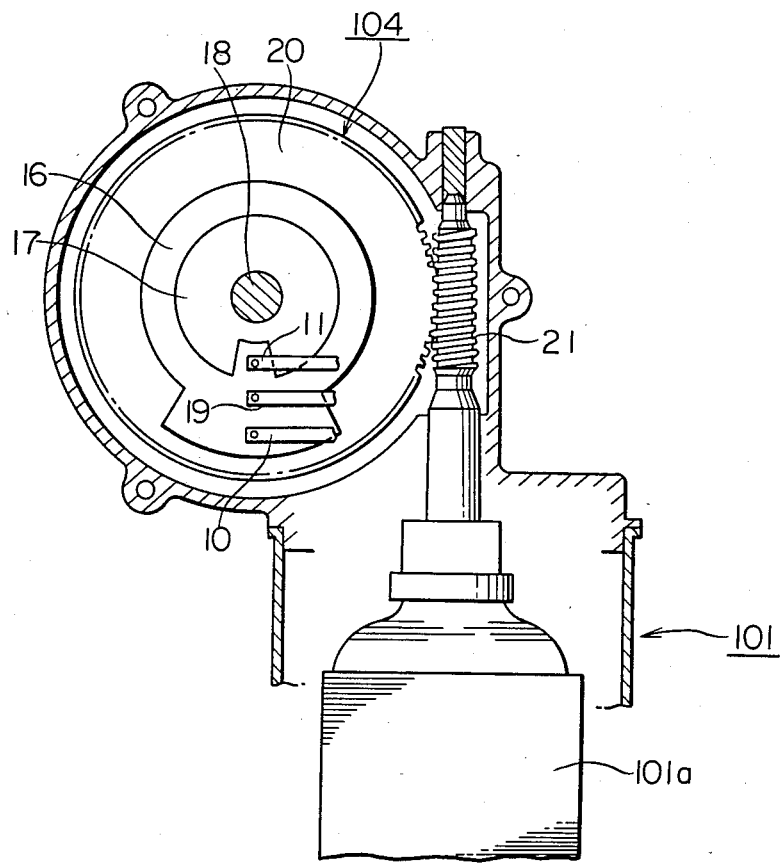
FIG. 3 is a configuration diagram showing the relationship between a wiper motor and a cam plate.

Relative mounting positions of the wiper motor 101 and the cam plate are shown in FIG. 3. Numeral 20 designates the cam plate. Gears formed along the entire periphery of the cam plate are in mesh with a worm gear 21 fixed on the rotatable shaft of the wiper motor 101, whereby the cam plate 20 is driven rotatably around the shaft 18. In the drawing, numeral 16 designates the electrode plate, and numeral 17 an insulating member, which are fixed on the cam plate 20. Numerals 10, 11 and 19 designate the brushes making up the contacts (brush contacts), and numeral 101a an armature. The rotary motion of the cam plate 20 is converted into a swinging motion of the wiper blade through a link mechanism described later. The rotary motion of the cam plate and the swinging motion of the wiper blade have a predetermined corelationship with each other.

Figure 4:
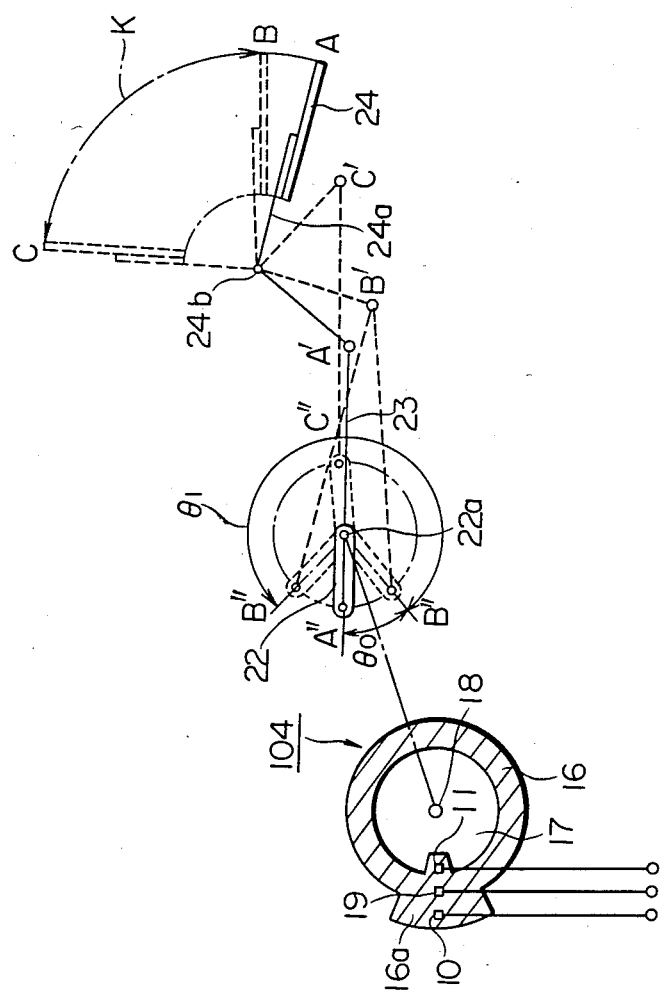
FIG. 4 is a diagram for explaining relative mounting positions of a link mechanism for swinging the wiper blade and an electrode plate.

FIG. 4 is a schematic diagram showing the coupled relationship between the wiper blade position detector 104 and the wiper blade. The shaft 18 of the cam plate and the rotary shaft 22a of the crank arm 22 are coupled to each other and integrally rotated in relative positions shown in the drawing. As a result, with the rotation of the cam plate 20, the crank arm 22 rotates in the same direction, in the same phase and at the same speed around the rotary shaft 22a as the cam plate. The end part of the crank arm 22 is coupled through a connecting rod 23 to the lower end of the wiper arm 24a of the wiper blade 24, thereby making up a crank mechanism. The lower part of the wiper arm 24a is bent at a predetermined angle at the rotational center 24b, and therefore with the rotation of the crank arm 22, the wiper blade 24 effects the swinging motion within a predetermined wiping range (K). In FIG. 4, the position A of the wiper blade 24 indicates the accommodation dwell position, the position B the lower limit of the wiping range (lower limit reversing position), and the position C the upper limit of the wiping range (upper limit reversing position). Positions A', B', C' of coupling points of the connecting rod 23 and positions A'', B'', C'' of the crank arm 22 are shown in correspondence with the positions A, B, C. According to the embodiment under consideration, during the wiping operation of the wiper blade 24, the crank arm 22 repeatedly reverses at an angle $\theta_1$, and each reversing operation of the crank arm 22 causes the wiper blade 24 to swing from B to C to B.

Now, the circuit connections will be explained with reference to FIG. 2. Numeral 106 designates a selection command circuit for designating the detection of a selected one of the dwell position and the reversing position of the cam plate 20, including a three-input OR gate 30 with an inverter for only one input terminal and a NOR gate 31. The input terminal with an inverter of the OR gate 30 is connected through a resistor $R_1$ to the power supply and the terminal $C_1$, and the other inputs through resistors $R_2$ and $R_3$ to the terminals $+1$ and $+2$ of the wiper operating switch 103 respectively. The input terminals of the NOR gate 31 are supplied with an output of the OR gate 30 and an output of the control circuit 7 through a resistor $R_4$.

Numeral 105 designates a selection control circuit including AND gates 33 and 34. A selection signal $S_1$ produced from the selection command circuit 106 is applied to the selection control circuit 105. One input terminal of the AND gate 33 is supplied directly with the selection signal $S_1$, and one input of the AND gate 34 with a selection signal $S_1$ reversed through an inverter. As a result, one of the AND gates 33 and 34 is open. The other input terminal of the AND gate 33, by contrast, is connected through a resistor $R_5$ to the contact 11, and the other input terminal of the AND gate 34 through a resistor $R_6$ to the contact 10. The AND gate 33 works as a stop signal gate, and the AND gate 34 as a reversing signal gate.

Numeral 107 designates a drive signal output circuit including an OR gate 36 having five input terminals supplied with output signals from the control circuit 7, the terminals $+1$ and $+2$ and the AND gates 33, 34 respectively. The drive signal $S_2$ (high level) produced from the drive signal output circuit 107 is supplied to the forward-reverse selection circuit 109.

The forward-reverse selection circuit 109 includes two AND gates 38 and 39, each having one of the input terminals thereof supplied with the drive signal $S_2$ Numeral 108 designates a storage circuit including a D-type flip-flop. The CP terminal of the storage circuit 108 is supplied with the reversing signal $S_3$ from the AND gate 34, and the CL terminal thereof with the selection signal $S_1$. The output Q of the storage circuit 108 is supplied for the other input terminals of the AND gates 38 and 39 respectively. The output Q is applied to the AND gate 38 through an inverter and to the AND gate 39 directly. In the storage circuit 108, the reversing signal $S_3$ indicates the fall caused by the contact 10 in contact with the electrode plate 16, and each time of application of the reversing signal $S_3$ (high to low), the output Q is reversed in state. The initial state where the contact 10 is located at the central part of the arcuate protrusion 16a of the electrode plate 16 represents the low level of the output Q. In accordance with the state of the output Q of the storage circuit 108, either the AND gate 38 or 39 is opened.

The output of the AND gate 38 is applied through a timing circuit 41 and a resistor $R_7$ to the base of the transistor $T_{r1}$. Upon conduction of the transistor $T_{r1}$, a forward relay coil 5a is energized, and a relay contact 5b normally connected to ground is switched to the power supply.

The output of the AND gate 39 is applied through a timing circuit 42 and a resistor $R_8$ to the base of the transistor $T_{r2}$. Upon conduction of the transistor $T_{r2}$, a reversing relay coil 6a is energized, so that the relay contact 6b normally connected to ground is switched to the power supply. The timing circuits 41 and 42 secure the time of dynamic braking by making up a shorting circuit at the time of changing the direction of rotation of the wiper motor 101, while setting a time lag for switching the relay contacts 5b and 6b after the reduction in current by dynamic braking. Specifically, when the outputs of the AND gates 38 and 39 drop to low level, the transistors $T_{r1}$ and $T_{r2}$ are cut off a predetermined time $t_1$ later, while when the outputs of the AND gates 38 and 39 rise to high level, on the other hand, the transistors $T_{r1}$ and $T_{r2}$ conduct immediately.

Numeral 43a designates a relay coil adapted to be energized when the wiper selection switch 103 is set to the HI position. Upon energization of the relay coil 43a, the relay contact 43b held normally at low speed position is switched to high speed position.

Figure 5:
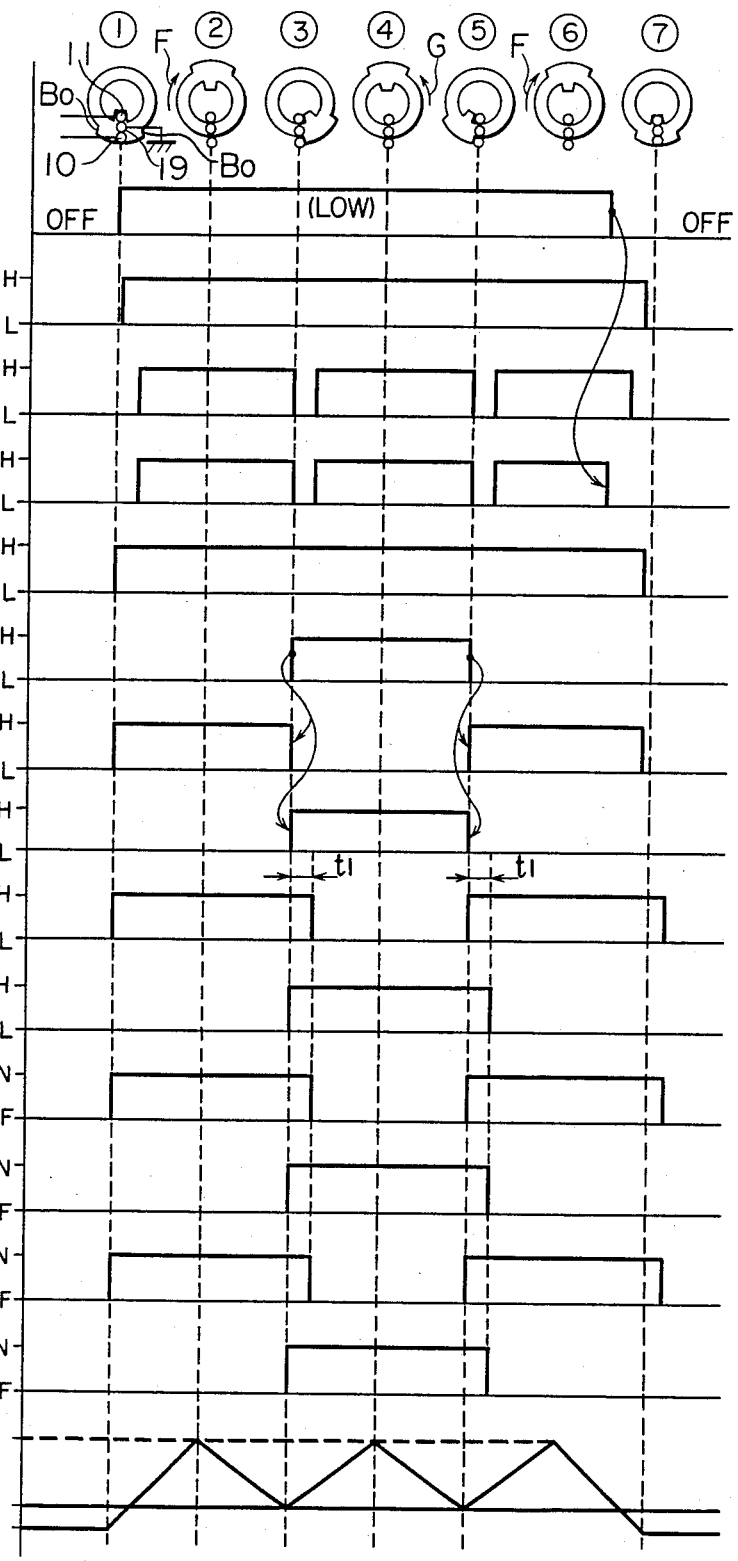
FIG. 5 is a time chart showing the rotation of the electrode plate as related to the state of the various parts of the circuit and the position of the wiper blade.

Now, an explanation will be given of the operation of the wiper apparatus by a control device having the circuit configuration described above with reference to FIGS. 2, 4 and 5.

In the initial state (①  FIG. 5) shown in FIG. 2, the output of the NOR gate 31 is at high level, while the output Q of the storage circuit 108 at low level. When an ignition switch 2 is turned on to select the LOW position of the wiper operating switch 103, the terminals $+B$ and $+1$ are connected, so that one of the inputs of the OR gates 30, 36 is raised to high level through the resistor $R_3$. As a result of selecting the wiper operating switch 103 to LOW position, the AND gate 34 is kept open through the OR gate 30 and the NOR gate 31, while the fact that the output Q of the storage circuit 108 is held at low level keeps the AND gate 38 open. As a consequence, the drive signal $S_2$ produced from the OR gate 36 is applied through the AND gate 38, timing circuit 41 and the resistor $R_7$ to the base of the transistor $T_{r1}$. The transistor $T_{r1}$ is thus turned on thereby to energize the relay coil 5a, thereby connecting the relay contact 5b to the power terminal. The wiper motor 101 is supplied with current from the car battery 1 through the relay contact 43b thereby to start the wiper motor 101 in forward direction. With the start of the wiper motor 101, the wiper blade 24 begins to rise from the accommodation point A on the one hand, and the electrode plate 16 and the insulating member 17 are rotated in the direction of F integrally through the cam plate 20. The contact 10 comes away from contact with the arcuate protrusion 16a with the rotation of the electrode plate 16, and rises to high level. The forward drive of the wiper motor 101 continues (② of FIG. 5) until the contact 10 comes into contact with the other edge $B_0$ of the arcuate protrusion 16a again (③ of FIG. 5). In the meantime, the wiper blade 24 moves from point B to C to B to complete a reciprocation of wiping operation.

Figure 6:
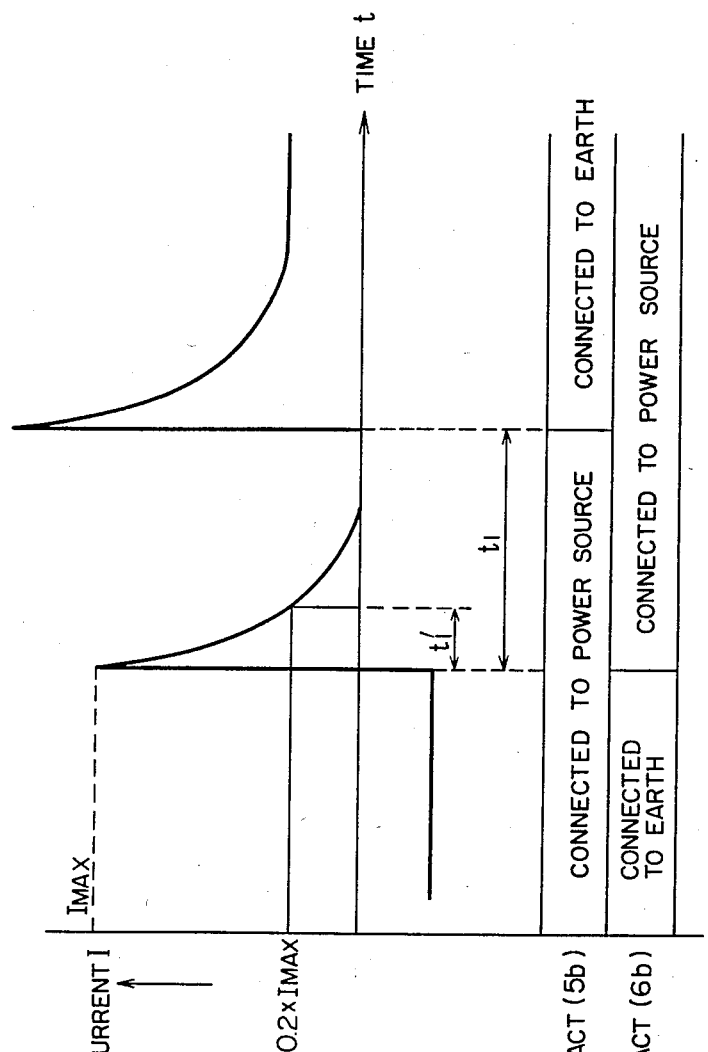
FIG. 6 is a diagram for explaining the relations between the starting current and generated current during the reversal of the wiper motor.

When the contact 10 comes into contact with the arcuate protrusion 16a at the edge B₀ (③ of FIG. 5), the contact 10 drops to potential zero and generates a reversing signal S₃. This reversing signal S₃ is applied through the AND gate 34 to the CP terminal of the storage circuit 108 thereby to change the output Q thereof to high level. As a result, the AND gate 38 is closed and the AND gate 39 opened, so that the drive signal S₂ is applied through the timing circuit 42 and the resistor R₈ to the base of the transistor $T_{r2}$, energizing the relay coil 6a, connecting the relay contact 6b to the power terminal. Even after the output of the AND gate 38 changes from high to low level, the operation of the timing circuit 41 prevents immediate switching of the relay contact 5b to the ground side, but the relay contact 5b is held to the power side for a predetermined time $t_1$. During this time $t_1$, the two terminals of the armature 101a are shorted through the relay contacts 5b, 6b, with the result that dynamic braking occurs for a predetermined time, during which the current generated in the wiper motor 101 is reduced through the shorting circuit. Normally, the time $t_1$ is set to at least $t_1'$ at which the dynamic current I represents 20% of the peak value $I_{max}$ as shown in FIG. 6. After the lapse of time $t_1'$ the output of the timing circuit 41 is changed to low level, and the relay contact 5b is connected to ground through the transistor $T_{r1}$ and the relay coil 5a. As a result, the starting current flows in the armature coil 101a from the relay contact 6b toward the relay contact 5b, thus starting the reversing motion of the wiper motor 101. With the reversing motion of the wiper motor 101, the above-mentioned configuration causes the rotation of the electrode plate 16 in the direction G (④ of FIG. 5), so that the wiper motor 101 and the electrode plate 16 continue to rotate until the contact 10 comes into contact with the other edge B₀ (⑤ of FIG. 5). When the contact 10 comes into contact with the other edge B₀, the reversing signal S₃ is generated to reduce the output Q of the storage circuit 108 to low level. The forward-reverse selection circuit 109 functions to connect the relay contact 5b to the power side, and after the lapse of time $t_1$ set by the timing circuit 42, connects the relay contact 6b to ground. In this case, the forward voltage is also applied to the armature 101a only after the dynamic current is reduced by the shorting circuit.

During the period when the above-mentioned operation causes alternate forward and reverse operations of the cam plate 20 within a range defined by the edges B₀ and B₀, the crank arm 22 repeats a similar rotation in dependence upon the motion of the cam plate 20, so that the wiper blade 24 makes a reciprocation between B and C around the rotational center 24b at intervals of each rotation of the wiper plate 20 (at an angle $\theta_1$ shown in FIG. 4). In changing the rotational direction of the wiper motor 101, the terminals of the armature 101a are made equal in potential and thus shorted to each other for a predetermined length of time by the function of the timing circuits 41, 42 thereby to cause dynamic braking, and after the dynamic current is thus reduced below a predetermined level, the reversing voltage is applied. By doing so, the amount of current required for switching the relay contacts 5b and 6b is reduced for a remarkably lengthened service life of the relay contacts.

Next, when the wiper operating switch 103 is set to the OFF position during the rotation of the wiper motor 101 in the direction F (⑥ of FIG. 5), the terminal +1 is reduced to low level, and therefore the output of the NOR gate 31 is raised to high level through the OR gate 30. As a result, the AND gate 33 opens while the AND gate 34 is closed, so that the output of the AND gate 34 drops to low level. Since the CL terminal of the storage circuit 108 rises to high level, however, the output Q thereof is held as it is. Also, the output of the AND gate 33 is raised to high level since the contact 11 is in contact with the insulating member 17, with the result that the output thereof is applied through the OR gate 36 to the AND gate 38 which is open, whereby the wiper motor 101 continues to be driven. When the contact 11 comes into contact with the electrode plate 16 at the position of the inward protrusion 16b (⑦ of FIG. 5), a stop signal S₄ representing the zero potential is generated and therefore the output of the AND gate 33 drops to low level. After the lapse of the length of time set by the timing circuit 41 the relay contact 5b is connected to ground. In this way, the wiper blade 24 is moved to the accommodation position A and stops there (⑦ of FIG. 5).

When the wiper operating switch 103 is set to the HI position, the terminal +2 becomes high in level, and the relay coil 43a is energized. At the same time, the output level of the NOR gate 31 becomes low, while the output of the OR gate 36 becomes high. As a consequence, the energization of the relay coil 43a switches the relay contact 43b to the high-speed side. Under this high-speed condition, the function of the wiper blade position detector 104 and the circuit operations cause, as in the above-mentioned case of LOW position, the wiper blade 24 to reciprocate for wiping operation.

When the wiper operating switch 103 is set to the INT position, on the other hand, the terminal $C_1$ is grounded, and the low-level signal is applied through the resistor $R_1$ to the OR gate 30. As a result, the OR gate 30 produces a high-level signal, while the NOR gate 31 produces a low-level signal. The resulting low-level signal is applied to the AND gates 33 and 34. The AND gate 34 is thus opened. The low-level signal mentioned above is applied also to the control circuit 7, with the result that the control circuit 7 produces an intermittent pulse signal. This pulse signal is applied to the OR gate 36. The high-level signal outputted from the OR gate 36 turns on the transistor $T_{r1}$ via the AND gate 38 since the output Q of the storage circuit 108 is at low level, thereby actuating the relay coil 5a and the relay contact 5b thereby to drive the wiper motor 101 in the forward direction. With the forward rotation of the wiper motor 101, the cam plate in the wiper blade position detector 104 rotates in synchronism with the wiper motor 101, so that a high-level signal is applied to the transistor $T_{r1}$ continuously from the contact 10 through the AND gate 34 and the OR gate 36. Therefore, even after the output of the control circuit 7 discontinues, the wiper motor 101 continues to be driven to the lower stop position of the wiper blade 24. When the contact 10 is grounded again at the other edge B₀, the output of the OR gate 36 is reduced to low level to stop the wiper motor 101. At the same time, the CP terminal of the storage circuit 108 changes from high to low level, thereby reversing the output Q to high level. This state is maintained until a high-level signal is produced from the control circuit 7 the next time. When another pulse signal is supplied from the control circuit 7, the fact that the AND gate 39 is kept open by the output Q turns on the transistor $T_{r2}$, and thus reverses the operation of the wiper motor 101 in the manner mentioned above. The subsequent operation is similar to that mentioned above, and this operation is repeated until the selection of the INT position is cancelled.

Figure 7:
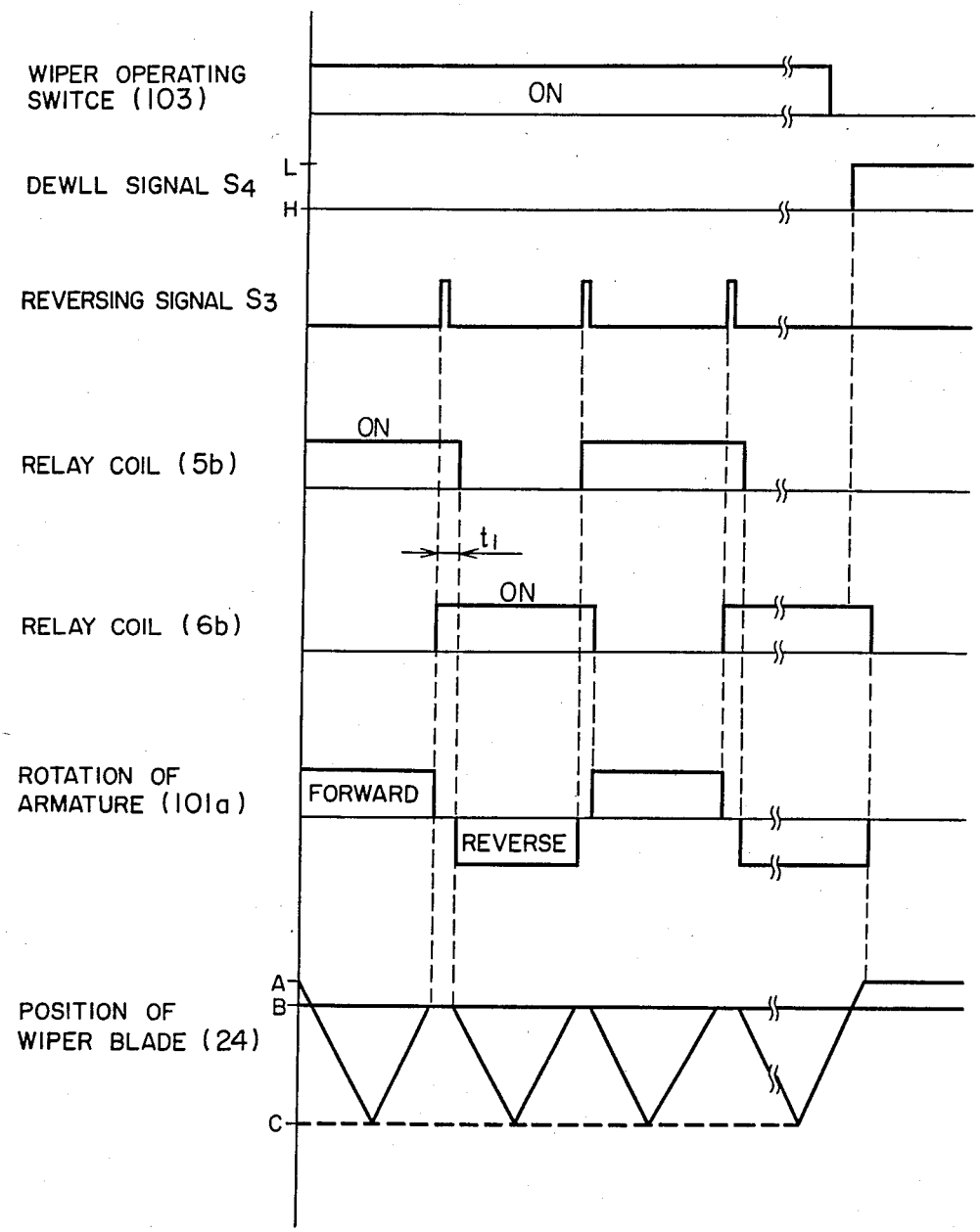
FIG. 7 is a time chart showing the relations between a stop signal, a reversal signal and the rotation of the armature.

FIG. 7 is a timing chart showing relative operations of the reversing signal $S_3$, stop signal $S_4$, armature 101a and the wiper blade 24. In this timing chart, the stop signal $S_4$ is shown in opposite ways at low and high levels, and the reversing signal $S_4$ as a pulse in the fall state. As obvious from this timing chart, a dwell time $t_1$ occurs at the forward or reverse turning start points of the armature 101a, during which the wiper blade 24 also stops at the lower limit point B of the wiping range.

In the embodiment described above, modifications described below are possible. Although the delay function due to the timing circuits 41, 42 is caused when the output of the AND gates 38, 39 changes from high to low level, the same circuits may be configured in such a manner that the delay operation occurs when the output of the AND gates 38, 39 changes from low to high level. Also, the time $T_1$ is not necessarily strictly determined in relation with the time $t_1'$ but may be set as desired according to the object or application thereof involved. Further, instead of the link mechanism used for operation of the wiper blade 24, a cable or gear may be used, or the arm of the wiper blade 24 may be directly coupled to the shaft of the wiper motor 101.

A second embodiment of the invention will be explained below. According to this embodiment, wiper apparatus is provided in which the crank arm is caused to make not one rotation but a predetermined small angular range movement by the wiper motor whereby the space required by the crank arm motion is reduced for effective utilization of the internal space of the vehicle.

For this purpose, the crank arm connected by a connecting link with the wiper arm is driven in forward or reverse direction within a predetermined angular range by forward or reverse drive of the shaft of the wiper motor respectively, and the wiper arm and the wiper blade mounted thereon are swung for wiping operation, while maintaining the crank arm 22 within the rotational angle of 270° or less.

The crank arm 22 is driven in forward and reverse directions within an angular range of 270° or less to reciprocate the wiper arm and the wiper blade for the wiping process, and therefore the internal space of the car body required for the operation of the crank arm is reduced. Also, since the crank arm as well as the connecting members (such as a link or a reciprocating cable) is provided, the fact remains that the wiper arm can be driven from a distant position where the wiper motor is located.

A second embodiment of the present invention will be explained below with reference to the attached drawings.

Figure 8:
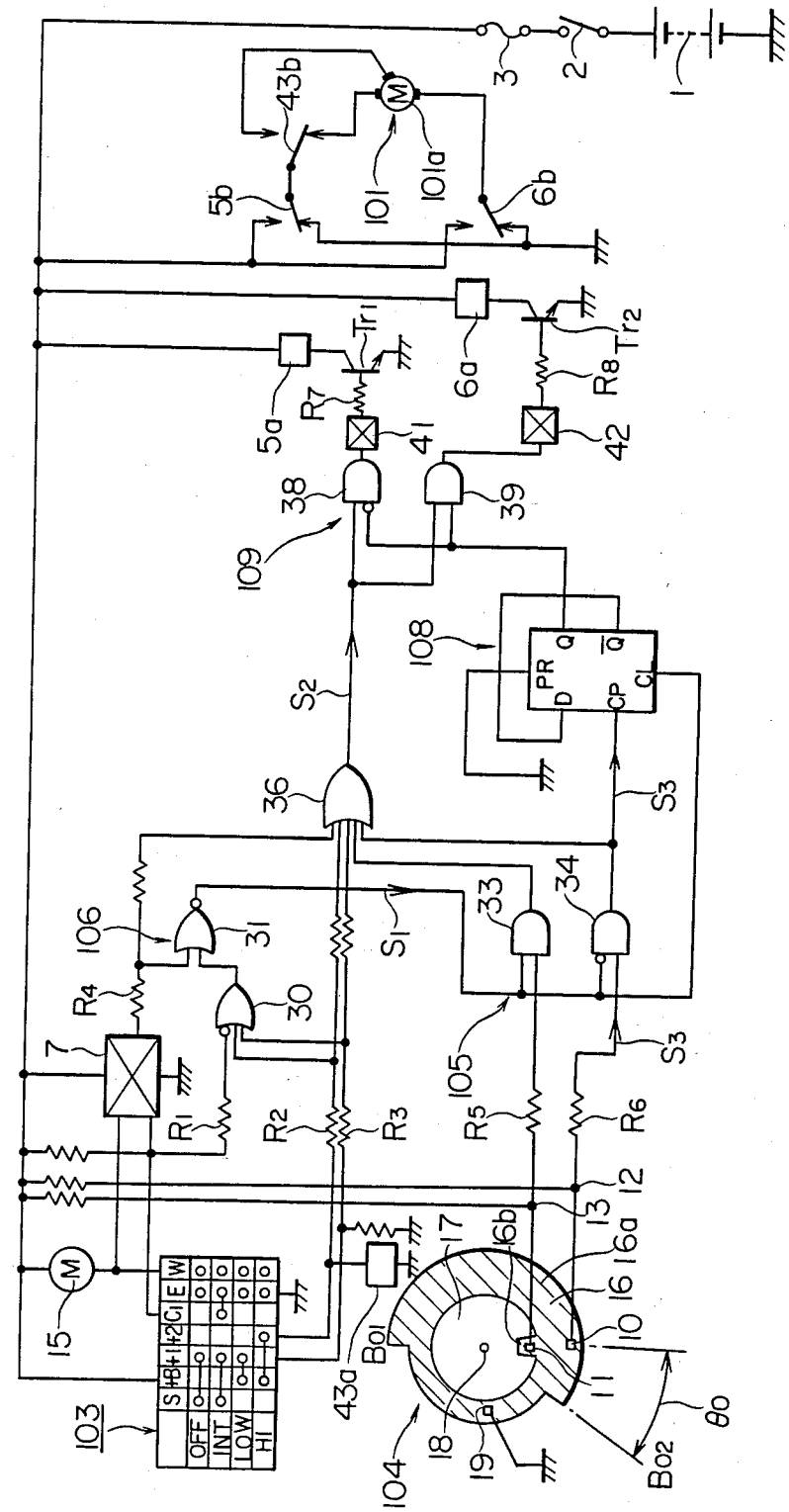
FIG. 8 is a diagram similar to FIG. 2 showing a second embodiment of the present invention.

FIG. 8 is a diagram showing an electrical circuit for controlling the operation of a wiper apparatus according to the present invention. In FIG. 8, reference numeral 1 designates a car battery, numeral 2 an ignition switch, and numeral 3 a fuse. These component parts are connected in series, so that when the ignition switch 2 is turned on, power is supplied from the battery 1 to the various parts of the electrical circuit. Power from the car battery 1 is supplied to the armature 101a of the wiper motor 101 through the relay contacts 5b, 6b, 43b, and upon conduction of the transistors $T_{r1}$, $T_{r2}$ to the forward relay coil 5a and the reverse relay coil 6a. Further, the power is transmitted to the intermittent operation control circuit 7, the wiper operation switch 103, the nodes 12, 13 connected to the contact points 10, 11 made up of brushes of the wiper blade (or crank arm) position detector 104, and the selection command circuit 106 respectively.

The wiper operating switch 103 is shown in the form of a connection table shown in FIG. 8, and has four selective positions for the wiper motor 101 including the stop operation (OFF), intermittent operation (INT), low-speed operation (LOW) and high-speed operation (HI), and seven connecting terminals S, +B, +1, +2, $C_1$, E and W. The battery 1 is connected to the terminal +B, the washer motor 15 to the terminal W, and the intermittent operation control circuit 7 to the terminals $C_1$, W respectively, while the terminal E is grounded. The connections between terminals with each selective position selected are shown in the connection table.

Figure 9:
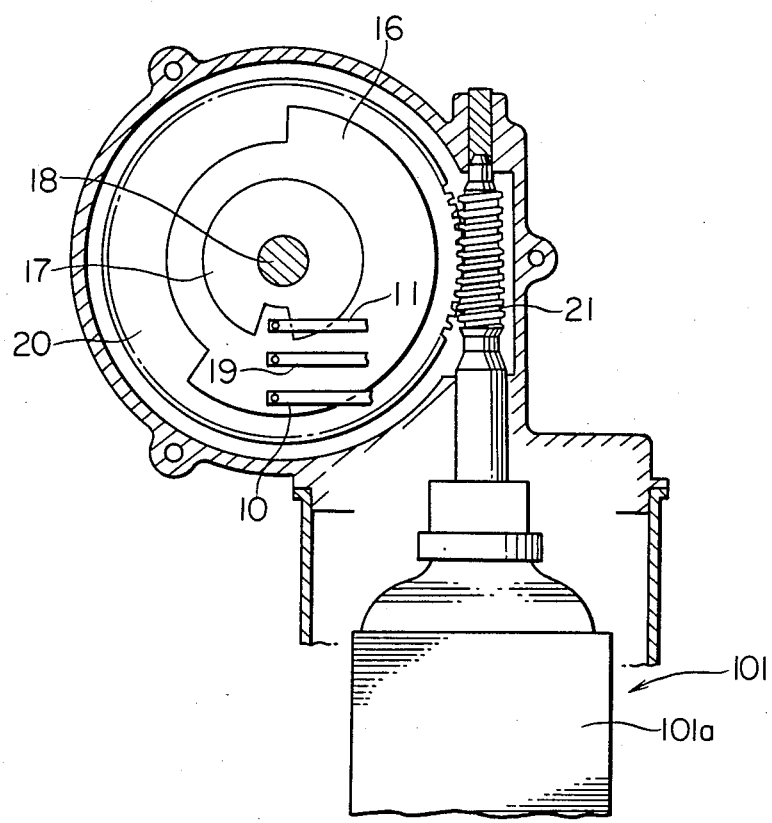
FIG. 9 is a configuration diagram showing the relations between the wiper motor and the cam plate according to a second embodiment of the present invention.

The wiper blade position detector 104 includes a cam plate described later (not shown in FIG. 8), an electrode plate of the shown shape mounted on the cam plate, and an insulating member 17 of, say, resin formed on the surface of the electrode plate 16. The cam plate, the electrode plate 16 and the insulating member 17 are adapted to rotate integrally around the shaft 18. The electrode plate 16 has formed on the outer peripheral portion thereof a part 16a protruded at an angle of $\pi + \theta_0$ and a protruded part 16b at a predetermined position along the inner periphery corresponding to the protrusion 6a. As a result, a blank part $\pi - \theta_0$ is formed along the outer periphery of the electrode plate 16. The electrode plate 16 has fixed thereon three contacts 10, 11 and 19 made up of brushes in contact with each other as shown in FIGS. 8 and 9. The contact 19 is kept in contact with the electrode plate 16 while at the same time being grounded. The contact 11, which is for detecting the stop position (corresponding to the wiper blade accommodation position) of the cam plate, is located in the position of being able to come in contact with the protrusion 16b. The contact 10, which is for detecting the reversing point of the cam plate (corresponding to the upper and lower limits of the wiping range of the wiper blade and the reversing point of the crank arm), is located in the position of being able to come in contact with the protrusion 16a. The positions of the edges $B_{01}$, $B_{02}$ of the protrusion 16a set the reversing point of the cam plate.

FIG. 9 shows the relative mounting positions of the wiper motor 101 and the cam plate. Numeral 20 designates a cam plate with teeth formed along the entire peripheral part thereof in mesh with a worm gear 21 provided on the output shaft of the wiper motor 101, thereby driving the cam plate 20 around the shaft 18. In the drawing, numeral 16 designates an electrode plate, and numeral 17 an insulating member, which are both mounted securely on the cam plate 20. Numerals 10, 11 and 19 designate brushes made of a conductive and elastic metal plate, and numeral 101a an armature. The rotational motion of the cam plate 20 is converted into the swinging motion of the wiper arm through a link mechanism described later. The rotational motion of the cam plate 20 and the swinging motion of the wiper blade have a predetermined corelationship.

Figure 11:
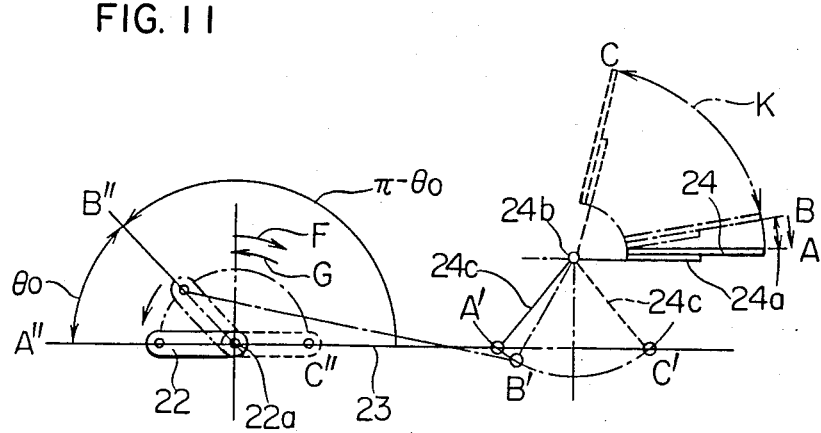
FIG. 11 is a diagram for explaining the operation of the crank arm according to the second embodiment of the present invention.

FIG. 11 is a diagram showing a coupled relationship between the crank arm 22 and the wiper arm 24a according to the present invention. The shaft 18 of the cam plate 20 shown in FIG. 9 is integrally constructed and rotated with the rotary shaft 22a of the crank arm 22 shown in FIG. 12. As a result, with the rotation of the cam plate 20, the crank arm 22 is rotated around the rotary shaft 22a in the same direction, in the same phase and at the same speed as the cam plate 20. The end part of the crank arm 22 is coupled to the lower end of the lower lever 24c of the wiper arm 24a through a link rod 23 making up a coupling member (which may be a reciprocating cable). The lower side of the wiper arm 24a is connected to the pivot portion 24b, which in turn is connected to the lower lever 24c. Thus, with the rotation of the crank arm 22, the lower lever 24c and hence the wiper arm 24a swings within a predetermined wiping range K in synchronized relation with the crank arm 22. In FIG. 11, character A designates the accommodating stop position of the wiper blade 24 and the wiper arm 24a, character B the lower limit point of the wiping range, and character C the upper limit point of the wiping range. The positions A, B and C correspond to positions A', B' and C' of coupling points, and the positions A'', B'' and C'' of the crank arm 22 respectively. According to the embodiment under consideration, during the wiping operation of the wiper blade 24, the crank arm 22 repeats the wiping reciprocations within the angular range of $\pi - \theta_0$, in such a way that one reciprocation thereof performs the operation of the wiper blade 24 from point B to C (or from point C to B).

Now, an explanation will be given of the connections of the electrical circuit according to FIG. 8.

Numeral 106 designates a selection command circuit for commanding selection of either one of stop position detection and reversing point detection due to the cam plate 20. The selection command circuit 106 includes a 3-input OR gate 30 with an inverter for only one of the inputs thereof, and a NOR gate 31. The input terminal with an inverter of the OR gate 30 is connected to the terminal $C_1$ through the resistor $R_1$, and the other input terminals to the terminals $+1$ and $+2$ of the wiper operating switch 103 through the resistors $R_3$ and $R_2$ respectively. The input terminal of the NOR gate 31 is supplied with an output of the intermittent operation control circuit 7 through the resistor $R_4$ and an output of the OR gate 30.

Numeral 105 designates a selection control circuit including AND gates 33 and 34. The selection signal $S_1$ produced from the selection command circuit 106 is applied to the selection control circuit 105. One of the inputs of the AND gate 33 is supplied directly with the selection signal $S_1$, while one of the inputs of the AND gate 34 is supplied with an inverted selection signal $S_1$ through an inverter. Thus, one of the AND gates 33 and 34 is opened. Also, the other input terminal of the AND gate 33 is connected to the contact 11 through the resistor $R_5$, and the other input terminal of the AND gate 34 to the contact 10 through the resistor $R_6$. The AND gate 33 functions as a stop signal gate, and the AND gate 34 as a reversing signal gate.

Numeral 36 designates a drive signal output circuit including an OR gate. The OR gate 36 includes five input terminals which are respectively supplied with outputs from the control circuit 7, the terminals $+1$ and $+2$, and the AND gates 33 and 34. The drive signal $S_2$ produced from the OR gate 36 is supplied to the forward-reverse selection circuit 109.

The forward-reverse selection circuit 109 includes two juxtaposed AND gates 38 and 39. One of the input terminals of each of the AND gates 38 and 39 is supplied with the drive signal $S_2$.

Numeral 108 designates a storage circuit including a D-type flip-flop. The CP terminal of the storage circuit 108 is supplied with the reversing signal $S_3$ produced from the AND gate 34, and the CL terminal with the selection signal $S_1$. The output Q of the storage circuit 40 is applied to the other input terminal of each of the AND gates 38 and 39 of the forward-reverse selection circuit 109. The output Q is supplied through an inverter to the AND gate 38 and directly to the AND gate 39. In the storage circuit 108, the reversing signal $S_3$ is indicative of a fall that occurs when the contact 10 located at the blank position is brought into contact with the electrode plate 16, and each time of the application of this reversing signal $S_3$, the output Q is reversed. In the initial state where the contact 10 is located on the protrusion 16a of the electrode plate 16 as shown, the output Q is at low level. According to the condition of the output Q of the storage circuit 108, either of the AND gate 38 or 39 is opened.

The output of the AND gate 38 is applied through the timing circuit 41 and the resistor $R_7$ to the base of the transistor $T_{r1}$. When the transistor $T_{r1}$ conducts, the forward relay coil 5a is energized, so that the relay contact 5b normally connected to the ground is connected to the power side.

The output of the AND gate 39 is applied through the timing circuit 42 and the resistor $R_8$ to the base of the transistor $T_{r2}$. When the transistor $T_{r2}$ begins to conduct, the reversing relay coil 6a is energized, and the relay contact 6b which is normally grounded is connected to the power side. The timing circuits 41 and 42 are for setting a time lag to secure the time for dynamic braking when the rotational direction of the wiper motor 4 is changed, and to switch the relay contacts 5b and 6b after the reduction in the current by dynamic braking. Specifically, when the outputs of the AND gates 38 and 39 change to low level, respectively, the transistors $T_{r1}$ and $T_{r2}$ are turned off a predetermined time $t_1$ later, while if the outputs of the AND gates 38 and 39 change to high level, on the other hand, the transistors $T_{r1}$ and $T_{r2}$ are turned on immediately.

Numeral 43a designates a relay coil energized when the wiper operation switch 103 is set to the HI position. Upon energization of the relay coil 43a, the relay contact 43b, which is held low normally, is switched to the high-speed state.

Figure 10:
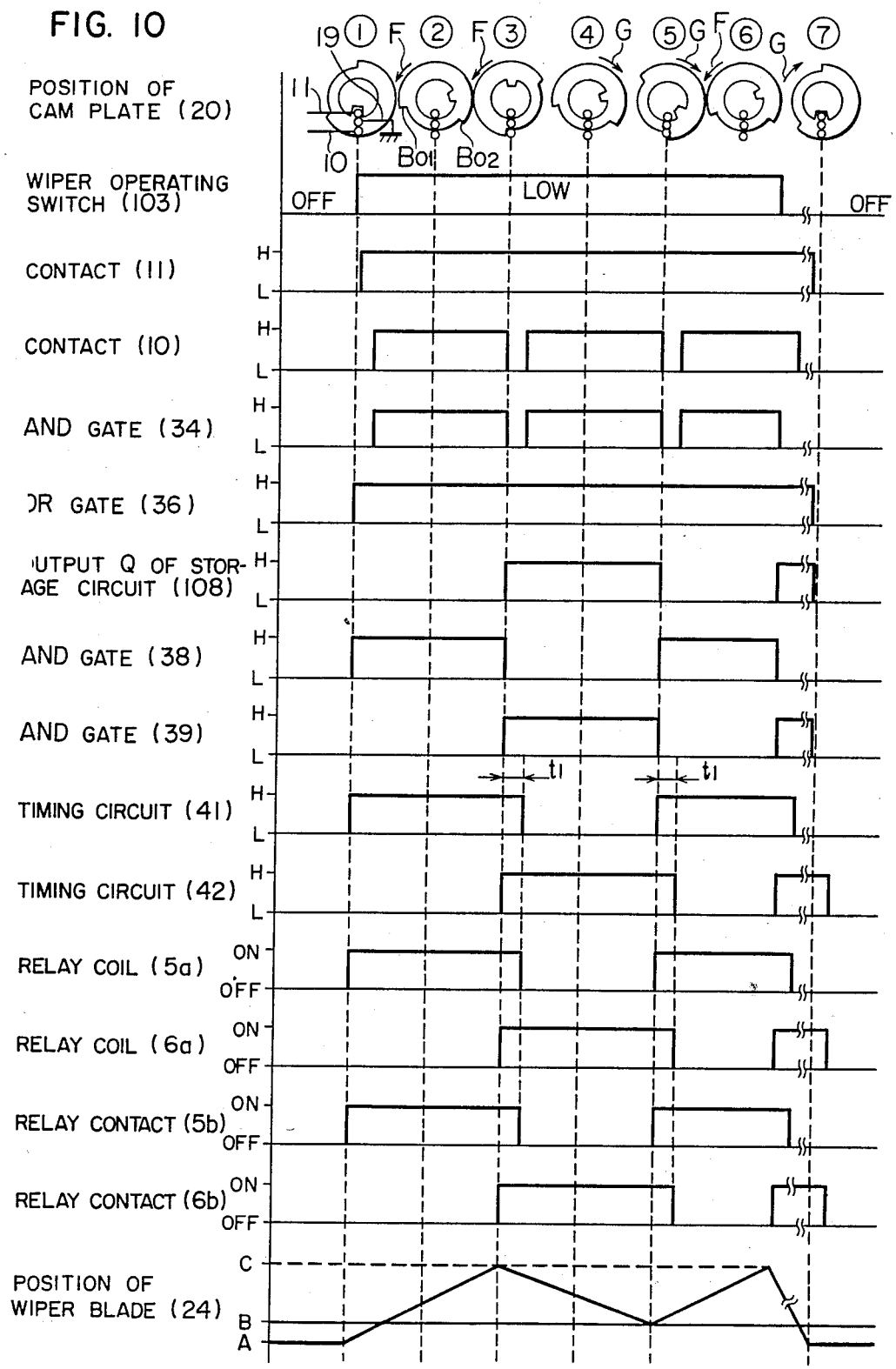
FIG. 10 is a timing chart for explaining the operation of the electrical circuit shown in FIG. 8.

The operation of a wiper apparatus according to the present invention will be explained below with reference to FIGS. 9, 10 and 11.

In the initial state shown in FIG. 8 (See also ① of FIG. 10), the output $S_1$ of the NOR gate 31 is at high level, and the output Q of the storage circuit 108 at low level. When the ignition switch 2 is turned on and the wiper operation switch 103 is set to the LOW position, the terminals $+B$ and $+1$ are connected with each other, and one of the inputs to the OR gates 30 and 36 is raised to high level through the resistor $R_3$. As a result of selecting the wiper operation switch 103 at LOW position, a low-level signal $S_1$ is produced through the OR gate 30 and the NOR gate 31, and therefore the AND gate 34 is held open to produce a high-level signal while the output Q of the storage circuit 108 is held low at the same time thereby to hold the AND gate 38 open. Therefore, the drive signal $S_2$ from the OR gate 36 is applied through the AND gate 38, the timing circuit 41 and the resistor $R_7$ to the base of the transistor $T_{r1}$. As a consequence, the transistor $T_{r1}$ conducts, and the relay coil 5a is energized thereby to connect and turn on the relay contact 5b to the power terminal. The wiper motor 101 is supplied with the current from the car battery 1 through the relay contact 43b and thereby is started in the forward direction. With the forward drive of the wiper motor 101, the wiper blade 24 is raised from the accommodation point A through the crank arm 22, etc., while the electrode plate 16 and the insulating member 17 are integrally rotated in the direction F with the cam plate 20. With the rotation of the electrode plate 16, the contact 10 is separated from the protrusion 16a, and is raised to high level. The forward drive of the wiper motor 101 continues (②) of FIG. 10) until the contact 10 is brought into contact with the other edge $B_{01}$ of the protrusion 16a again (③ of FIG. 10). In the meantime, the wiper blade 24 moves from positions B to C to perform the wiping operation.

When the contact 10 is brought into contact with the protrusion 16a at the other edge $B_{01}$ (③ of FIG. 10), the contact 10 is reduced to potential zero thereby to generate a reversing signal $S_3$ (low level). This reversing signal $S_3$ is applied through the AND gate 34 to the CP terminal of the storage circuit 108 thereby to change the output Q to high level. By doing so, the AND gate 38 is closed, while the AND gate 39 is opened, thus applying the drive signal $S_2$ to the base of the transistor $T_{r2}$ through the timing circuit 42 and the resistor $R_8$, with the result that the relay coil 6a is energized thereby to connect the relay contact 6b to the power terminal. Even when the output of AND gate 38 is changed from high to low level, on the other hand, the function of the timing circuit 41 prevents immediate switching of the relay contact 5b to the ground side, but holds it to the power side for a predetermined time $t_1$ (FIG. 10). During this period $t_1$, the terminals of the armature 101a are shorted through the relay contacts 5b and 6b, so that the dynamic current generated in the wiper motor 101 continues to flow through the shorting circuit and gradually declines to apply the dynamic brake. Normally, the time $t_1$ is set to a level associated with a dynamic current representing more than about 20% of the maximum peak value. After the lapse of the time $t_1$, the output of the timing circuit 41 is reduced to low level, and the relay contact 5b is connected to the ground through the transistor $T_{r1}$ and the relay coil 5a. As a result, the starting current flows in the armature 101a from the relay contact 6b toward the relay contact 5b, thus starting the wiper motor 101 in reverse direction. With the start of wiper motor 101 in reverse direction, the above-mentioned configuration causes the electrode plate 16 and the crank arm 22 to move in the direction of G and the wiper blade 24 in the opposite direction (from C to B) (④ of FIG. 10). The rotation of the wiper motor 101 and the electrode plate 16 continue until the contact 10 comes into contact with the other edge $B_{02}$ (⑤ of FIG. 10). When the contact 10 comes into contact with the edge $B_{02}$, the reversing signal $S_3$ is generated and the output Q of the storage circuit 108 is reduced to low level (⑤ of FIG. 10). By the function of the forward-reverse selection circuit 109 described above, the relay contact 5b is connected to the power side, and after the time $t_1$ set by the timing circuit 42, the relay contact 6b is connected to the ground. In this case, too, the forward voltage is applied after the dynamic current is applied through a shorting circuit and is reduced, thus applying the electrical brake.

While the cam plate 20 reciprocates between forward and reverse rotations within the range defined by the edges $B_{01}$ and $B_{02}$ by the above-mentioned operation, the crank arm 22 also repeats the same rotation in correspondence with the cam plate 20, so that for each rotation (angle $\pi - \theta_0$), the wiper arm 24a and the wiper blade 24 are moved from position B to C or the opposite way around the rotational center 24b.

Assume that the wiper operating switch 103 is set to the OFF position. The terminal +1 is reduced to low level, and therefore the output of the NOR gate 31 is raised to high level through the OR gate 30. As a result, the AND gate 33 is opened and the AND gate 34 closed. The output of the AND gate 34 is reduced to low level, and therefore the output Q of the storage circuit 40 is set in such a manner as to rotate the wiper motor 101 in the direction G. Also, the output of the AND gate 33 is raised to high level since the contact 11 is in contact with the insulating member 17. The output of the AND gate 33 is applied through the OR gate 36 to the opened AND gate 38, whereby the wiper motor 101 is started in reverse direction G by the functions explained above. When the contact 11 is brought into contact with the electrode plate 16 at the position of the protrusion 16b, a stop signal representing a zero potential is generated. Thus the output of the AND gate 33 is reduced to low level, and after the time set by the timing circuit 42, the relay contact 6b is connected to the ground. In this way, the wiper blade 24 is moved until it comes to a stop at the accommodation point A (⑦ of FIG. 10).

When the wiper operating switch 103 is set to the HI position, the terminal +2 is raised to high level, and the relay coil 43a is energized while the output of the NOR gate 31 is reduced to low level with the output of the OR gate 36 increased to high level. As a result of the energization of the relay coil 43a, the relay contact 43b is switched to the high-speed drive side. Under this high-speed mode, the rotation of the wiper motor 101, the function of the wiper blade position detector 104 and the operation of the whole circuit cause the reciprocation of the wiper blade 24 in the same manner as in the LOW position mentioned above, thus performing the high-speed wiping operation.

Upon selection of the wiper operating switch 103 to the INT position, the terminal $C_1$ is grounded thereby to open the AND gate 34 through the OR gate 30 and the NOR gate 31, while at the same time generating a pulse signal intermittently from the intermittent operation control circuit 7. This pulse signal is applied to the OR gate 36 as a drive signal. When the wiper motor 101 and the cam plate 20 are set in rotational motion on the basis of the first pulse signal, the high-level signals obtained from the contact 10 and the AND gate 33 in the same manner as in the preceding case cause a continued drive of the wiper motor 101 thereby to accomplish a reciprocation of the wiper blade 24. Subsequently, each time the pulse signal is generated, the wiper blade 24 performs a cycle of wiping operation in similar fashion. In this way, the intermittent wiping operation continues until the selection of INT position is cancelled.

Figure 12:
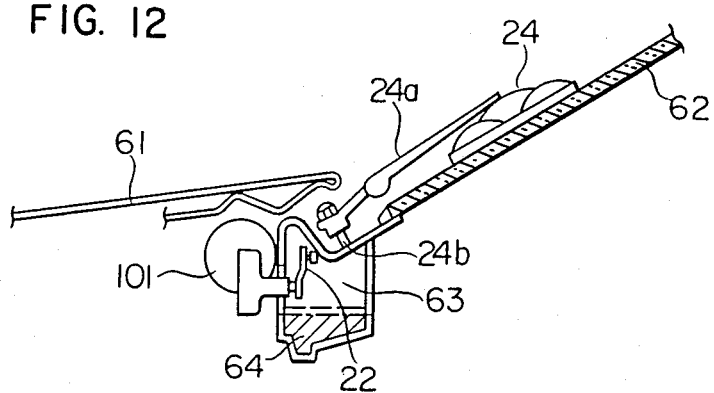
FIG. 12 is a configuration diagram showing the wiper apparatus according to the second embodiment mounted on a vehicle body.

FIG. 12 partially shows a sectional view of the car body having the wiper blade 24 mounted thereon. In FIG. 12, numeral 61 designates a bonnet hood, and numeral 62 a front windshield, on the front side of which there is the wiper blade 24 provided on the wiper arm 24a swingingly around the mounting shaft 24b. Under the bonnet hood 61, there is arranged the wiper motor 101, the output shaft of which is connected through the crank arm 22, etc. to the wiper arm 24a. With the rotation of the wiper motor 101 in the manner mentioned above, the crank arm 22 also begins to rotate in the manner shown in FIG. 11. On the basis of this rotation, the wiper arm 24a repeats the wiping operation. As a result, the crank arm 22, which is not required to be rotated 360°, is arranged under the bonnet hood 61. The size of a cowl ventilator 63 for securing the reciprocating space for the crank arm 22 and introducing the atmospheric air into the cabin is such that the shadowed part 64 is not required as compared with the prior art, thus making it possible to construct the ventilator 63 in small size. In this way, the space under the bonnet hood 61 is utilized effectively.

Figure 13:
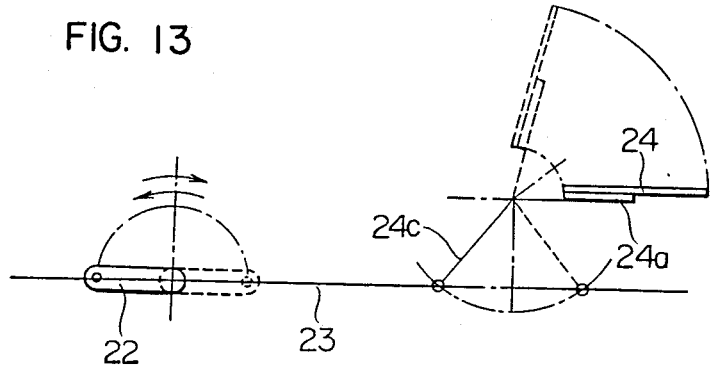
FIG. 13 is a diagram for explaining the crank arm according to a modification of the present invention.

FIG. 13 is a diagram showing interconnections of the crank arm 22 and the wiper blade 24 for a wiper apparatus of a non-accommodation type unlike the diagram of FIG. 11 showing which shows a wiper apparatus of the accommodation type. The crank arm 22 is rotated within the range of $\pi$, and therefore the protrusion (the part corresponding to 16a) of the electrode plate of the wiper blade position detector for controlling the rotational motion of the wiper motor which realizes the rotation of the crank arm 22 is also formed in the range of $\pi$. In this modification, too, the crank arm 22 is adapted to rotate within the range of angle $\pi$ in the upper side, so that the lower space of the cowl ventilator is not required, thus making effective space utilization possible.

Also, the range of rotational angle of the crank arm 22 can be set as desired by appropriately determining the shape of the electrode plate 16. Generally, it is set within a range smaller than $\pi$ (180°), although the angle of $3/2\ \pi$ (270°) may be selected.

We claim:

1. A control device for wiper apparatus using a two-direction rotatable motor, comprising:
   a wiper motor;
   means for detecting the position of a wiper blade driven by the wiper motor;
   switch means for controlling the current of the wiper motor to reverse the current of the wiper motor;
   a wiper operating switch producing a control signal;
   control means receiving said control signal, for starting the wiper blade from an accommodation stop position thereof with a starting operation of the wiper operating switch to perform a reciprocating wiping operation within a predetermined range through said switch means and returning the wiper blade to the accommodation stop position again;
   said position detecting means including brush means for generating a stop signal when said accomodation stop position is reached;
   reversing brush means for generating a reversing signal when the wiper blade reaches a position opposite to two reversing positions and within the predetermined range of the reciprocating wiping operation;
   a conductive portion for sliding contact with said brush means and said reversing brush means; and
   means for changing relative positions of the conductive portion with respect to said brush means and said reversing brush means with the rotation of the wiper motor;
   said control means including:
   means for changing an output signal each time the reversing signal from the reversing brush means of the position detecting means is introduced to an input side, producing said output signal at an output side thereof upon operation of the wiper operating switch for commanding the stop of the wiping operation;
   storage means for storing the output signal;
   forward-reverse selection means receiving the output signal from the storage means and for supplying a selected one of a forward and reversing signal to the switch means in accordance with the output signal of the storage means thereby to command selection of a selected one of forward and reverse drives; and
   means connected to the wiper operating switch and the position detecting means for generating a drive signal to control the switch means so as to stop the wiper blade at the accommodation stop position in accordance with the stop signal from the position detecting means.

2. A control device for a wiper apparatus according to claim 1, wherein said storage means includes a storage circuit with an input terminal, an output terminal and a storage clear terminal, an output voltage of said output terminal changes upon the of application of an input pulse of said input terminal, wherein the data stored is cleared and a predetermined voltage is produced at the output terminal when the wiper operating switch is set to a position for commanding the stop of the operation.

3. A control device for a wiper apparatus according to claim 1, wherein said drive signal generating means includes means connected to the wiper operating switch for generating a selection command having different signals in accordance with the operation of the wiper operating switch,
   means for producing a drive signal for driving the forward-reverse selection means on the basis of the control signal from the wiper operating switch, and
   selection control means for controlling the signal applied from the position detecting means to the storage means and the signal applied from the position detecting means to the drive signal generating means in accordance with the selection command from the selection command generating means.

4. A control device for a wiper apparatus according to claim 3, further comprising means connected to said wiper operating switch for generating an intermittent operation signal for actuating the wiper blade intermittently by applying the intermittent operation signal to the drive signal generating means.

5. A control device for a wiper apparatus according to claim 4, wherein said intermittent operation signal includes a pulse signal generated at predetermined intervals of time.

6. A control device for a wiper apparatus according to claim 1, wherein an output shaft of the wiper motor is connected to the wiper blade by a crank mechanism having a crank arm fixedly secured to the output shaft, said crank arm having a rotational angle of not more than 270°.

* * * * *